(12) United States Patent
Seagar et al.

(10) Patent No.: US 7,185,431 B1
(45) Date of Patent: Mar. 6, 2007

(54) METHOD OF MANUFACTURING A LINEAR COMPRESSOR

(75) Inventors: Neville David Seagar, Auckland (NZ); Ian Campbell McGill, Auckland (NZ); Gerald David Duncan, Auckland (NZ); Upesh Patel, Auckland (NZ); Andrew Paul Taylor, Auckland (NZ); Geoffrey Alan Lee, Auckland (NZ)

(73) Assignee: Fisher & Paykel Appliances Limited, Auckland (NZ)

( * ) Notice: Subject to any disclaimer, the term of this patent is extended or adjusted under 35 U.S.C. 154(b) by 257 days.

(21) Appl. No.: 10/399,314

(22) PCT Filed: Oct. 17, 2000

(86) PCT No.: PCT/NZ00/00201

§ 371 (c)(1), (2), (4) Date: Jul. 31, 2003

(87) PCT Pub. No.: WO02/35093

PCT Pub. Date: May 2, 2002

(51) Int. Cl.
*B23P 15/00* (2006.01)
*B23P 11/00* (2006.01)
*F04B 17/00* (2006.01)

(52) U.S. Cl. .............. 29/888.02; 29/888.021; 29/434; 417/415

(58) Field of Classification Search ......... 29/888.02, 29/888.021, 464, 451, 450, 436, 434; 417/415, 417/416, 417
See application file for complete search history.

(56) References Cited

U.S. PATENT DOCUMENTS

| | | | |
|---|---|---|---|
| 3,947,155 A | 3/1976 | Bidol | |
| 4,300,873 A | 11/1981 | Mowbray et al. | |
| 4,406,590 A * | 9/1983 | Kessler | 417/360 |
| 4,721,440 A * | 1/1988 | Hurst | 417/371 |
| 5,525,845 A | 6/1996 | Beale et al. | |
| 5,727,932 A * | 3/1998 | McGrath | 417/417 |
| 5,791,638 A | 8/1998 | Balsells | |
| 5,878,998 A | 3/1999 | Hsieh | |
| 6,079,960 A | 6/2000 | Funatsu et al. | |
| 6,089,836 A | 7/2000 | Seo | |

(Continued)

FOREIGN PATENT DOCUMENTS

EP 0499367 1/1995

(Continued)

*Primary Examiner*—David P. Bryant
*Assistant Examiner*—Sarang Afzali
(74) *Attorney, Agent, or Firm*—Trexler, Bushnell, Giangiorgi, Blackstone & Marr, Ltd.

(57) ABSTRACT

A method of manufacturing a linear compressor includes measures to account for possible variations in manufacture of the spring connecting between a cylinder part and a piston part. In the method, the piston is located at a predetermined axial position in the bore of the cylinder of the compressor. A spring that is connected with the cylinder part is extended so that a piston connection point of the spring is at a position based on a predetermined displacement of the spring or a position in which the spring exerts a predetermined reaction force. In this position, this piston and the spring connection point are thus separated by a distance that depends on the actual formed dimension of the individual spring. The piston and the piston connection point are subsequently joined to have a rigid axial separation that is fixed according to the separation attained in these steps.

3 Claims, 4 Drawing Sheets

U.S. PATENT DOCUMENTS 6,273,688 B1 * 8/2001 Kawahara et al. .......... 417/417
6,379,125 B1 * 4/2002 Tojo et al. ................... 417/417

FOREIGN PATENT DOCUMENTS

| | | | | |
|---|---|---|---|---|
| EP | 1002952 | | 5/2000 | |
| JP | 404060178 A | * | 2/1992 | ............. 417/416 |
| JP | 404121464 A | * | 4/1992 | ............. 417/416 |
| JP | 08200224 | | 8/1996 | |
| JP | 10238461 | | 9/1998 | |
| JP | 11093846 | | 4/1999 | |
| JP | 11117861 | | 4/1999 | |
| SU | 1151711 | | 4/1985 | |
| WO | WO9414173 | | 6/1994 | |
| WO | WO9418681 | | 8/1994 | |
| WO | WO9801675 | | 1/1998 | |
| WO | WO0032934 | | 6/2000 | |
| WO | WO0079671 | | 12/2000 | |

* cited by examiner

METHOD OF MANUFACTURING A LINEAR COMPRESSOR

BACKGROUND TO THE INVENTION

1. Field of the Invention

The present invention relates to a linear compressor, particularly but not solely for use in refrigerators.

2. Summary of the Prior Art

Compressors, in particular refrigerator compressors, are conventionally driven by rotary electric motors. However, even in their most efficient form, there are significant losses associated with the crank system that converts rotary motion to linear reciprocating motion. Alternatively a rotary compressor which does not require a crank can be used but again there are high centripetal loads, leading to significant frictional losses. A linear compressor driven by a linear motor would not have these losses, and can be designed with a bearing load low enough to allow the use of aerostatic gas bearings as disclosed in U.S. Pat. No. 5,525,845, where a laterally compliant connecting rod allows for the low bearing load A discussion of aerostatic gas bearings is included in "Design of Aerostatic Bearings", J W Powell, The Machinery Publishing Company Limited, London 1970. However with normal manufacturing tolerances and equipment production of effective gas bearings is difficult.

Conventional compressors are mounted within a hermetically sealed housing which in use acts as a reservoir of refrigerant gas. Refrigerant gas is drawn into the compressor from this reservoir and is exhausted through an exhaust conduit leading from the compressor, through the housing.

Operation of the compressor involves the reciprocation of moving parts leading to vibration of the compressor unit, in all three axis. To reduce the external noise effect of this vibration the compressor is mounted on isolation springs within the sealed housing.

With a linear compressor the piston vibrates relative to the cylinder in only one axis, with consequent reaction forces on whichever part, if either, is fixed. One solution proposed to this problem is to operate a pair of compressors synchronously in a balanced and opposed configuration. However this arrangement would be too complex and costly for use in a commodity item such as a domestic refrigerator. Another proposed solution is the addition of a resonant counterweight to reduce the vibration. However this approach limits the operation of the compressor because the counterweight is a negative feedback device and is limited to the fundamental unbalance force. A further solution is proposed in "Vibration characteristics of small rotary and linear cryogenic coolers for IR systems", Gully and Hanes, Proceedings of the 6th International Cryocooler Conference, Plymouth, Mass., 1990. This solution involves independently supporting the piston part and the cylinder part of the compressor within the housing so that the "stator acts as a counterweight". However in implementing this design in a domestic refrigerator there is a problem when the piston mass is low. In such a compressor, as the discharge pressure increases, the force of the compressed gas acts as a spring (the "gas spring") which increases the running speed as the discharge pressure increases. This is a problem because the "third" vibration mode (where the piston and the cylinder vibrate in phase with each other but out of phase with the compressor shell) is only slightly above the desirable "second" mode (where the shell does not vibrate and the piston and cylinder are out of phase). Thus the shell starts to vibrate intolerably as the "gas spring" starts to operate and effectively raises the "second" mode frequency to, and eventually above, the "third" mode.

It is desirable for many applications for the compressor to be of small size. This reduces the size of all components including the springs and their resonant system. Reducing the size of the compressor requires the compressor to run at higher frequencies. Reduced size in higher frequencies combined to increase the stresses in the spring components. In some linear compressors main springs have been made from pressed spring steel sheet. It has been found that the edges cut in the pressing operation require careful polishing to regain the original strength of the spring steel sheet, and are frequently subject to failure through inadvertent stress concentrations.

A further problem of compressors generally has been the build up of heat, particularly in the vicinity of the compressor cylinder and the cylinder head. The build up of heat is caused by friction between moving components and by heat transferred from the compressed refrigerant. The build up of heat creates significant problems of increased wear and of running conditions and tolerances between parts which vary according to the time period for which the compressor has been running. These effects may be particularly significant for linear compressors which may run for long periods of time and for which close clearances are particularly important, especially when aerostatic gas bearing systems are being used.

Another heating effect is from the irreversible heat loss prior to re-expansion from the refrigerant remaining within the compression space after compression. In linear compressors up to 15% of the compressed refrigerant may not be expelled, compared to up to 5% in crank driven compressors. This source of heat, which is negligible in conventional compressors, is an important source in linear compressors.

One approach to cooling the cylinder and cylinder head of the compressor involves using liquid refrigerant supplied from the condenser in the subsequent refrigeration system. For example in U.S. Pat. No. 2,510,887 liquid refrigerant from the condenser is supplied to a first cooling jacket surrounding the cylinder thence to a second cooling jacket surrounding the compressor head and subsequently is ejected from a venturi device into the discharge line connecting between the cylinder head and the condenser. This is in the context of a standard crank driven compressor. Also in the context of a standard crank driven compressor U.S. Pat. No. 5,694,780 shows a circuit in which liquid refrigerant from the condenser is elevated to a higher pressure by a pump. This liquid refrigerant is pumped into a cooling jacket surrounding the compressor cylinder. The liquid refrigerant is forced from the cooling jacket into the exhaust manifold into the cylinder head of the compressor where it mixes with the compressed refrigerant as the compressed refrigerant exits the compressor. This arrangement has the disadvantage of requiring an additional pump for forcing the liquid refrigerant through the cooling jacket surrounding the cylinder and subsequently into the exhaust manifold against the pressure of the compressed gas.

Many linear compressors have been made inside conventional compressor sheets as they have been intended as a drop in replacement for existing rotary-reciprocating compressors which are a commodity item. To achieve this compact size compressors have been made in which the stator, armature, cylinder and piston are all concentrically located. But conventional compressor dimensions constrain the size of the machinery compartment of a refrigerator and lead to wasted space in the compartment surrounding the compressor.

SUMMARY OF THE INVENTION

It is an object of the present invention to provide a compact linear compressor which goes some way to overcoming the abovementioned disadvantages.

In a first aspect the present invention consists in a linear compressor comprising:
  a cylinder part including a cylinder bore,
  a piston disposed in said bore and slidable therein,
  a main spring connecting directly or indirectly said cylinder part to said piston,
  a connecting rod connecting between said main spring and said piston and connecting said main spring to said piston,
  a stator having an air gap, said connecting rod passing through said air gap, and
  at least one armature pole located along said connecting rod.

In a further aspect the present invention consists in a linear compressor comprising:
  a cylinder part including a cylinder bore,
  a piston disposed in said bore and slidable therein,
  a main spring connecting directly or indirectly said cylinder part to said piston, and
  a connecting rod connecting between said main spring and said piston and connecting said main spring to said piston, with at least one of:
    (a) the connection between said piston and piston rod, and
    (b) the connection between said piston rod and said main spring, being a compliant connection.

In a further aspect the present invention consists in a refrigeration system including a resonant linear compressor having a co-operating piston and cylinder whose relative motion is governed by a spring system and an electromagnetic linear motor configured to drive the relative motion of said piston and cylinder at the resident frequency of said system, said refrigeration system using isobutane as a working fluid.

In a further aspect the present invention consists in a linear compressor including a co-operating piston and cylinder whose relative motion is governed by a spring system and an electromagnetic linear motor configured to drive the relative motion of said piston and cylinder at the resonant frequency of said spring system,
  a compression space above said piston,
  a chamber surrounding said cylinder,
  a cooled high pressure refrigerant inlet into said chamber, allowing refrigerant into said chamber sourced from after the condenser of a refrigeration circuit, and
  a compressed refrigerant outlet from said compression space, and
  a compressed refrigerant 4 exit path from said compression space leading to said chamber.

In a further aspect the present invention consists in a linear compressor comprising:
  a cylinder part including a cylinder bore,
  a piston disposed in said bore and slidable therein,
  a stator connected to said cylinder part at an end opposite said cylinder head end and having an air gap,
  a main spring connecting directly or indirectly between said piston and said cylinder part,
  a connecting rod connecting between said main spring and said piston and connecting said main spring to said piston, and
  an armature working within said air gap of said stator and connected with said piston rod.

In a further aspect the present invention consists in a spring particularly for use as the main spring connecting between a cylinder and piston part of a linear compressor comprising:
  a closed loop of high fatigue strength metal wire having a first straight section in a first plane and a second straight section in a second plane parallel to said first plane, and first and second helical sections of substantially constant curvature, each helical section connecting between an end of said first straight section and an end of said second straight section, said helical sections having the same direction of curvature moving from said first section to said second section.

In a further aspect the present invention consists in a linear compressor having a piston part and a cylinder part reciprocal relative to one another and a main spring as claimed as set forth above connecting between said piston part and said cylinder part.

In a further aspect the present invention consists in a linear compressor including:
  a cylinder part,
  a piston part,
  a main spring connecting between said cylinder part and said piston part and operating in the direction of reciprocation of said piston part relative to said cylinder part,
  a sealed housing,
  a linear electric motor arranged for operation between said cylinder part and said piston part,
  a cylinder part spring means connecting between said cylinder part and said housing part and operating in said direction of reciprocation; and characterised by:
    (a) said cylinder part spring means being made up of the combined effect of necessary connections between the cylinder part and the sealed housing including an exhaust conduit extending from said cylinder part at least to said housing; and/or
    (b) said cylinder part spring means having low stiffness, said piston part having less than ⅕ the mass of said cylinder part and the absence of a piston part spring means connecting directly between said piston part and said housing.

In a further aspect the present invention consists in a linear compressor comprising:
  a cylinder part including a cylinder bore,
  a piston disposed in said bore and slidable therein,
  a main spring connecting said cylinder part to said piston, said main spring connection with said cylinder part including at least a pair of mounting legs on said main spring,
  an abutment surface on said cylinder part in respect of each said lug of said main spring, each said lug of said main spring abutting the respective said abutment surface, said abutment surfaces shaped to prevent substantial movement of the respective said lug apart from in one direction, and
  spring retaining means bearing against each said lug from said one direction, said spring retaining means having a total precompression against said lugs at least in excess of any anticipated dynamic force exerted on said main spring in said one direction.

In a further aspect the present invention consists in a method of manufacturing a linear compressor including, for connecting a piston of the linear compressor to a spring of the linear compressor, the following steps which may be executed in any order:

(a) locating the piston in a predetermined axial position in the bore of the cylinder of the compressor;

(b) locating the piston connection point of a spring already connected with a cylinder part at a position based on a predetermined displacement of the spring or a position in which the spring exerts a predetermined reaction force; and (c) joining said piston and said piston connection point of said spring at a rigid axial separation fixed according to the separation attained through steps (a) and (b).

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

DETAILED DESCRIPTION

General Configuration

Figure 1:
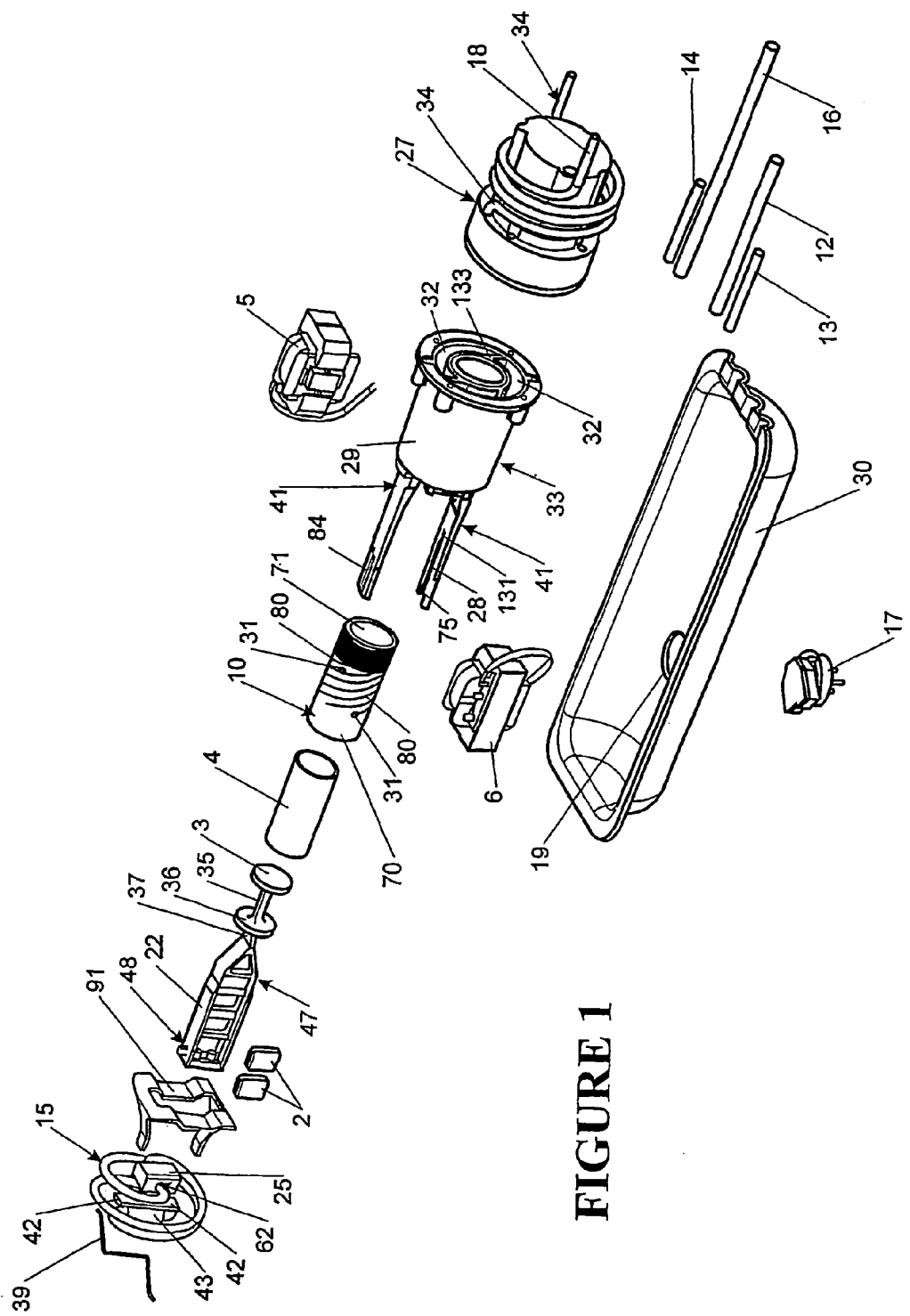
FIG. 1 is a partially exploded view from above of a linear compressor according to the preferred embodiment of the present invention.

A practical embodiment of the invention, shown in the Figures, involves a permanent magnet linear motor driving a resonantly reciprocating compressor, together operating within a hermetic casing. The compressor includes a piston 3, 4 reciprocating within a cylinder bore 71 and operating on a working fluid which is alternately drawn into and expelled from a compression space at the head end of the cylinder. A cylinder head 27 connected to the cylinder encloses an open end of the cylinder bore 71 to form the compression space and includes inlet and outlet valves 118, 119 and associated manifolds. The compressed working gas exits the compression space through the outlet valve 119 into a discharge manifold. The discharge manifold channels the compressed working fluid into a cooling jacket 29 surrounding the cylinder 71. A discharge tube 18 leads from the cooling jacket 29 and out through the hermetic casing.

The cylinder 71 and jacket 29 are integrally formed as a single entity 33 (for example a casting). The jacket 29 comprises one or more open ended chambers 32 substantially aligned with the reciprocation axis of the cylinder 71 and surrounding the cylinder 71. The open ended chambers 32 are substantially enclosed to form the jacket space (by the cylinder head assembly 27).

The linear motor includes a pair of opposed stator parts 5, 6 which are rigidly connected to the cylinder casting 33.

The piston 3, 4 reciprocating within the cylinder 71 is connected to the cylinder assembly 27 via a spring system. It operates at or close to its natural resonant frequency. The primary spring element of the spring system is a main spring 15. The piston 3, 4 is connected to the main spring 15 via a piston rod 47. The main spring 15 is connected to a pair of legs 41 extending from the cylinder casting 33. The pair of legs 41, the stator parts 5, 6, the cylinder moulding 33 and the cylinder head assembly 27 together comprise what will be referred to as a cylinder part 1 during discussion of the spring system.

The piston rod 47 connects the piston 3, 4 to the main spring 15. The piston rod 47 is preferably a rigid piston rod. The piston rod has a plurality of permanent magnets 2 spaced along it and forms the armature of the linear motor.

For low frictional loading between the piston 3, 4 and the cylinder 71, and in particular to reduce any lateral loading, the piston rod 47 is resiliently and flexibly connected with both the main spring 15 and with the piston 3,4. In particular a resilient connection is provided between the main spring end 48 of the piston rod 47 in the form of a fused plastic connection between an over moulded button 49 on the main spring 15 and the piston rod 47. At its other end the piston rod 47 includes a pair of spaced apart circular flanges 3, 36 which fit within a piston sleeve 4 to form the piston. The flanges 3, 36 are in series with and interleaved with a pair of hinging regions 35, 37 of the piston rod 47. The pair of hinging regions 35, 37 are formed to have a principle axis of bending at right angles to one another.

At the main spring end 48 the piston rod 47 is effectively radially supported by its connection to the main spring 15. The main spring 15 is configured such that it provides for a reciprocating motion but substantially resists any lateral motion or motion transverse to the direction of reciprocation of the piston within the cylinder. In the preferred embodiment of the invention the lateral stiffness is approximately three times the axial stiffness.

The assembly which comprises the cylinder part is not rigidly mounted within the hermetic casing. It is free to move in the reciprocating direction of the piston, apart from supporting connections to the casing: the discharge tube 18, a liquid refrigerant injection line 34 and a rear supporting spring 39. Each of the discharge tube 18 and the liquid refrigerant injection line 34 and the rear supporting spring 39 are formed to be a spring of known characteristic in the direction of reciprocation of the piston within the cylinder. For example the tubes 18 and 34 may be formed into a spiral or helical spring adjacent their ends which lead through the hermetic casing 30.

The total reciprocating movement is the sum of the movement of the piston 3, 4 and the cylinder part.

The Gas Bearings

The piston 3, 4 is supported radially within the cylinder by aerostatic gas bearings. The cylinder part of the compressor includes the cylinder casting 33 having a bore 71 therethrough and a cylinder liner 10 within the bore 71. The cylinder liner 10 may be made from a suitable material to reduce piston wear. For example it may be formed from a fibre reinforced plastic composite such as carbon fibre reinforced nylon with 15% PTFE (also preferred for the piston rod and sleeve), or may be cast iron with the self lubricating effect of its graphite flakes. The cylinder liner 10 has openings 31 therethrough, extending from the outside cylindrical surface 70 thereof to the internal bore 71 thereof. The piston 3, 4 travels in the internal bore 71, and these openings 31 form the gas bearings. A supply of compressed gas is supplied to the openings 31 by a series of gas bearing passages. The gas bearing passages open at their other ends to a gas bearing supply manifold, which is formed as an annular chamber around the cylinder liner 10 at the head end thereof between the liner 10 and the cylinder bore 71. The gas bearing supply manifold is in turn supplied by the compressed gas manifold of the compressor head by a small supply passage 73. The small size of the supply passage 73 controls the pressure in bearing supply manifold, thus limiting the gas consumption of the gas bearings.

The gas bearing passages are formed as grooves 80 in the outer wall 70 of the cylinder liner 10. These grooves 80 combine with the wall of the other cylinder bore 71 to form enclosed passages leading to the openings 31. It will be appreciated that while the grooves could alternatively be provided in the internal wall of the cylinder bore 71 they are more readily formed in the liner 10 than in the cylinder casting 33, being on an outer surface rather than an inner surface. Being able to machine the grooves into a surface of one or other part rather than having to drill or bore passages is a significant manufacturing improvement.

It has been found that the pressure drop in the gas bearing passages needs to be similar to the pressure drop in the exit flow between the piston 3, 4 and the bore 71 of the cylinder liner 10. Since the gap between the piston 3, 4 and the cylinder liner bore 71 (for an effective compact compressor) is only 10 to 15 microns, the sectional dimensions of the passages also need to be very small (approximately 40 microns deep by 150 microns wide). These small dimensions make manufacture difficult.

However in the preferred embodiment of the present invention this matching is made easier by increasing the length of the passages so that the sectional area can also be increased, for example to 70 microns×200 microns. This takes advantage of the ability to form grooves 80 of any appropriate shape in the surface of the liner part 10. The grooves 80 can be formed having any path, and if a tortuous path is chosen the length of the grooves 80 can be significantly greater than the direct path from the gas bearing supply manifold and the respective gas bearing forming openings 31. The preferred embodiment has the gas bearing grooves 80 following helical paths. The lengths of the respective paths are chosen in accordance with the preferred sectional area of the passage, which can be chosen for easy manufacture (either machining or possibly by some other form such as precision moulding).

The Cylinder Part

Each part 5, 6 of the stator carries a winding. Each part 5, 6 of the stator is formed with a "E" shaped lamination stack with the winding carried around the central pole. The winding is insulated from the lamination stack by a plastic bobbin. The particular form of each stator part does not form part of the present invention and many possible constructions will be apparent to persons skilled in the art.

As already referred to the cylinder part 1 incorporates the cylinder 71 with associated cooling jacket 29, the cylinder head 27 and the linear motor stator parts 5, 6 all in rigid connection with one another. Furthermore the cylinder part 1 incorporates mounting points for the main spring 15, the discharge tube 18 and the liquid injection tube 34. It also carries the mountings for cylinder part connection to the main spring 15.

The cylinder and jacket casting 33 has upper and lower mounting legs 41 extending from its end away from the cylinder head. The spring 15, the preferred form of which will be described later, includes a rigid mounting bar 43 at one end for connection with the cylinder casting 33. A pair of laterally extending lugs 42 extend from the mounting bar 43 and are spaced from the mounting bar 42 in a direction toward the cylinder casting 33. The lugs 42 are located to be axially in line with the portions 67, 68 of the spring immediately adjacent the entry of the spring ends into the mounting bar 43. The upper and lower mounting legs 41 of the cylinder casting 33 each include a mounting slot for one of the lugs 42. The mounting slot takes the form of a rebate 75 on the inner face 76 of the mounting leg 41 extending from the free end 77 of the leg 41 towards the cylinder jacket 29. At least one tapered protrusion 78 is formed on the inwardly facing face 82 of each rebate 75. Each such protrusion 78 has a perpendicular face 79 facing the cylinder casting 33 so that the protrusions 78 form barbs for a snap fit connection during assembly. In particular the lateral spacing of the lugs 42, which substantially matches the spacing between opposed faces 82 of the rebates, is such that the lugs 42 will only pass the barbs 78 through deformation of the lugs 42, the mounting legs 41 or both. Once past the protrusions or barbs 78 the lugs 42 are trapped between the perpendicular faces 79 of the barbs 78 and the perpendicular faces 83 forming the end face of the rebates 75. An additional rebate or depression 84 is formed on the outer face 85 of each of the mounting legs 41. This rebate 84 extends axially along the outer face 85 and is spaced from the free end 77 of the respective mounting leg 41 at a distance such that each of the further rebates 84 at least meets with the respective rebate 75 on the inside face 76 of its mounting leg 41. The rebates 75 and 84 are of sufficient depth that where they meet or overlap at least an axial opening 86 is provided between them.

A clamping spring 87, preferably formed from stamped and folded non-magnetic sheet metal, has a central opening 88 through it such that it may fit over the pair of mounting legs 41. The clamping spring 87 has rearwardly extending legs 89 associated with each mounting leg 41. The free ends 90 of these legs 89 slide within the outer face rebates 84 of the mounting legs 41 and are sufficiently small to pass through the axial openings 86 between the outer and inner rebates 84 and 75. With the lugs 42 of the main spring mounting bar 43 in place in the inner rebates 75 of the mounting legs 41 these free ends 90 press against the lugs 42 and hold them against the perpendicular faces 79 of the respective barb 78. Retention of the clamping spring 87 in a loaded condition supplies a predetermined preload against the lugs 42.

It is preferred that the clamping spring perform the parallel task of mounting the stator parts 5, 6. The central hole 88 through the clamping spring 87 is closely dimensioned with respect to the mounting legs 41, at least in a lateral direction relative to the mounting legs 41. The clamping spring 87 includes a stator part clamping surface 91 in each of its side regions 92 which span between the mounting legs 41 of the cylinder casting 33.

The cylinder casting 33 includes a pair of protruding stator support blocks 55 extending from the springward face 58 of the jacket 29 at positions in between the positions of the mounting legs 41.

Each of the "E" shaped lamination stacks of the stator part 5, 6 have a vertically oriented perpendicular step 69 on their outer face 56. In each case this is an outward step taken in a direction away from the motor air gap. That portion of each of the faces 56 which is closer to the air gap bears against either the support blocks 55 of the cylinder casting 33 or the stator engaging surfaces 91 of the clamping spring 87 as appropriate. When in position natural attraction between the parts of the motor will draw the stator parts 5, 6 towards one another. The width of the air gap is maintained by the location of the perpendicular step 57 against outer edges 40, 72 of the mounting blocks 55 and clamping spring 87 respectively. To additionally locate the stator parts 5, 6 in a vertical direction (the stator engaging surface) of each mounting block 55 includes a notch 57 in its outer edge which in a vertical direction matches the dimension of the "E" shaped lamination stack.

This part of the motor is assembled in a series of operations. The piston assembly is introduced to the cylinder casting 33. Firstly the piston assembly including the piston rod 47 with its integral flanges 3, 36, the piston sleeve 4 and the armature magnets 2 is assembled. The piston, formed by the piston sleeve 4 and the leading flange 3, which forms the piston face, is pushed into the bore 71 of the cylinder, being introduced through the cylinder opening 7 lying between the legs 41 of the cylinder casting 33. The piston connecting rod 47 therefore resides between the legs 41. The inner facing surfaces 76 of the legs 41 include axial slots 28 extending from the rebates 75 along a centre line. Outwardly extending lugs 130 on the piston connecting rod 47 reciprocate within these slots 28 in operation. The accuracy of assembly is such that in general (in the absence of knocks or external motion) the lugs 130 will not contact the surfaces of the slots. However at their ends closest to the cylinder casting 33 the slots 28 include a narrowed and shallowed portion 131 which provides a close fit with the lugs 130 of the connecting rod 47. The piston assembly is pushed into the cylinder bore 71 until the lugs 130 engage within these narrowed portions 131 and until the face of the piston is in a predetermined position relative to the machined cylinder head receiving face 133 of the cylinder casting 33.

The clamping spring 87 is fitted over the mounting legs 41 and the main spring 15 is fitted to the legs 41 by engagement of the lugs 42 into the inwardly facing rebates 75 and past the barbs or protrusions 78. The clamping spring 87 is pushed in a direction away from the cylinder casting 33 and compresses against the mounting lugs 42 until sufficient space is available for introduction of the stator parts 5, 6 between the stator part engaging surfaces 91 of the clamping spring 87 and the mounting blocks 55 of the cylinder casting 33. The stator parts 5, 6 are then introduced into their position and the clamping spring 87 is released. The width of the stator parts 5, 6 maintains a predetermined compression in the clamping spring 87.

A connection is then made between the main spring 15 and the piston rod 47. It is to be noted that the piston is in a predetermined location which is further toward the cylinder head than will be the case during operation of the compressor. The connection is made by fusing the plastic of an over moulded button 25 on the main spring 15 and the plastic of the rearward end 48 of the piston connecting rod 47. The fusion is performed by hot plate welding. At the time of hot plate welding the spring 15 is preferably extended to a predetermined position or until the spring 15 is exerting a predetermined force. The hot plate weld and fusion between the two plastic components with the piston face in its predetermined position and the spring 15 at its predetermined displacement provides accurate location of the piston relative to the cylinder casting 33 once the spring 15 has been released to its neutral position. This is the case irrespective of any eccentricities in the form of the spring 15 or cumulative inaccuracies due to tolerances in the components in the assembly chain.

Cylinder Head

The open end of cylinder casting 33 is enclosed by the compressor head 27. The compressor head thereby encloses the open end of cylinder 71, and of the cooling jacket chambers 32 surrounding the cylinder 71. In overall form the cylinder head 27 comprises a stack of four plates 100 to 103 together with a suction muffler/intake manifold 104.

The open end of cylinder casting 33 includes a head securing flange 135. The head securing flange 135 has a number of threaded holes 136 spaced around its perimeter into which securing bolts are tightened to draw the stack of plates 100 to 103 together and secure it to the face of the cylinder moulding 33.

An annular rebate 133 is provided in the face of the flange 135. On opposed sides of the flange 135 the rebate 133 includes outwardly extended lobes 137, 138 which act as ports for the discharge tube 18 and the return tube 34 respectively.

Openings are provided between the three chambers in the cylinder casting 33.

First head plate 100 fits over the open end of the cylinder moulding 33 within the annular rebate 133. It is relatively flexible and acts as gasket. It encloses the cylinder jacket openings but has a major central opening and does not cover the open end of cylinder 71. A compressed gases return port 110 extends through plate 100 adjacent to the lobe 138 associated with the liquid refrigerant return pipe 34. The edge of this opening 110 closest to the outer wall of the cooling jacket 29 is spaced slightly away from that wall at least in the vicinity of the lobe 138. The effect of this is that, with gases moving through the opening 110 into the cooling jacket chamber, a small area of reduced pressure is created immediately behind the plate 100 and adjacent the lobe 138 of the rebate 135.

A further opening 115 is provided through plate 100 at a position closer to the discharge pipe 18.

Second head plate 101 fits over the first plate 100. Second plate 101 is of larger diameter than plate 100 and is rigid. It may be made from steel, cast iron, or sintered steel. The plate 101 is more extensive than the rebate within which plate 100 sits. The plate 101 resides against the face of the flange and compresses the first plate 100 against the rebate. The plate 101 has openings 139 spaced around its perimeter sized so that the threaded portion of the bolts pass through freely.

The second head plate 101 incorporates a compressed gas discharge opening 111 in registration with opening 110. It also includes a further opening 117 in registration with opening 115 in first plate 100.

A portion of the plate 101 encloses the cylinder opening 116 of plate 100. Through that portion of plate 101 pass an intake port 113 and a discharge port 114. A spring steel inlet valve 118 is secured to the cylinder facing face of plate 101 such that a head portion of it covers the intake port 113. The base of the inlet valve 118 is clamped between the plate 100 and the plate 101 and its position is secured by dowels 140. A spring steel discharge valve 119 is attached to the face of plate 101 away from the cylinder. A head portion of it covers the discharge opening 114. The base of valve 119 is clamped between the second plate 101 and the third plate 102 and located by dowels 141. The discharge valve 119 fits and operates within a discharge manifold opening 112 of the third plate 102 and a discharge manifold 142 formed in the fourth plate 103. The inlet valve 118 sits (apart from its base) within the cylinder compression space and operates in it.

The spring steel inlet and discharge valves 118,119 operate entirely under the influence of prevailing pressures. With the piston withdrawing in the cylinder 71 a lower pressure exists on the cylinder side of inlet valve 118 than on the inlet manifold side of it. Accordingly the inlet valve 118 opens to allow refrigerant to enter the compression chamber. With the piston advancing in the cylinder 71 a higher pressure exists in the compression space than in the inlet manifold and the inlet valve 118 is maintained in its closed position by this pressure differential. The inlet valve 118 is biassed towards this closed position by its own resilience.

Similarly the discharge valve is normally biassed into a closed position, in which it is maintained by the prevailing pressures during withdrawal of the piston within the cylinder 71. It is pushed into an open position by a higher pressure in the compression space than in the discharge manifold during advance of the piston within the cylinder 71.

The third head plate 102 fits within a circular rebate 143 in the cylinder facing face 144 of fourth plate 103. The plate 102 is relatively flexible and serves as a gasket and is compressed between fourth plate 103 and second plate 101. The third plate 102 includes a large opening 112 which is in registration with an extensive rebate 142 in the face 144 of fourth plate 103. Together the opening 112 and the rebate 142 form the discharge manifold into which compressed refrigerant flows from discharge port 114.

A further opening 121 through third plate 102 is in registration with a rebate 145 in the face 144 of fourth plate 103. The opening 121 is also in registration with the openings 117 and 115 of second plate 101 and first plate 100. A gas filter 120 receives compressed refrigerant from the rebate 145 and delivers it to the gas bearing supply passage 73 through holes 146, 147 in the first and second plates.

An intake opening 95 through third plate 102 is in registration with intake port 113 in second plate 101. The opening 95 is also in registration with an intake port 96 passing through fourth plate 103. A tapered or frusto-conical intake 97 in the face 98 of fourth plate 103 leads to the intake port 96. The intake port 96 is enclosed by the intake muffler 104. The intake muffler 104 comprises for example a one piece moulding having a substantial open space in its side facing the cylinder casting. This space is enclosed by the fourth plate 103 when it is connected to it. The suction muffler 104 may be connected to the stack of plates 100 to 103 by any number of possible means, for example by fitting a surrounding lip of the muffler within a channel in the face of fourth plate 104 or by bolting the head plates to the cylinder casting through flanges on the muffler, thereby securing the muffler to the fourth plate 103 as part of the stack. The suction muffler 104 includes a passage 93 extending from the enclosed intake manifold space to open out in a direction away from the cylinder moulding 33. This passage is the refrigerant intake passage. With the compressor situated within its hermetic housing an internal projection 109 of an intake tube 12 extending through the hermetic housing extends into the intake passage 93 with generous clearance.

The Cooling Jacket

As already described, interconnected cooling jacket chambers 32 are provided around the compression cylinder 71. In compressing the refrigerant gas the gas reaches a state having a significantly higher temperature than the temperature at which it enters the compression space. This heats the cylinder head 27 and the cylinder wall liner 10.

In the present invention a supply of liquid refrigerant is used to cool the cylinder wall/liner, the cylinder head and the compressed refrigerant.

The liquid refrigerant is supplied from the outlet of a condenser in the refrigeration system. It is supplied directly into the cooling jacket chambers 32 surrounding the cylinder. The discharged newly compressed refrigerant passes into the chambers before leaving the compressor via discharge tube 18. In the chamber 32 the liquid refrigerant vaporises absorbing large quantities of heat from the compressed gas and from the surrounding walls of the cylinder castings 33 and from the cylinder head 27.

The liquid refrigerant exiting the condenser is at a slightly lower pressure than the refrigerant immediately after compression which is a barrier to liquid flow to the discharge side of the pump. However it is preferred that a passive arrangement is used for bringing the liquid refrigerant into the cooling jacket. In the present invention this is accomplished by several aspects of the construction of the compressor. Firstly a small region of lowered pressure is provided immediately adjacent the outlet from the liquid return line 34 into the jacket space. The origin of this region of lower pressure has already been described. It comes about through the flow of compressed gas into the jacket through compressed gas opening 110 in head plate 100. The second aspect is a slight inertial pumping effect created by the reciprocating motion of the liquid refrigerant return pipe 34 in the direction of its length. This reciprocation is a result of operation of the compressor, and the associated reciprocating movement of the entire cylinder part the vibration of the cylinder creates a fluctuating acceleration of an axially aligned length 148 of return pipe 34 that produces a fluctuating pressure at the end of the liquid return pipe 34 where it meets inlet 33. Because the liquid evaporates immediately as it enters the cooling jacket during the high pressure fluctuation, any reverse flow during the low pressure fluctuation is a flow of gas. As the gas has a very low density compared to liquid very little mass flow returns through the small notch joining liquid return line 34 to the cooling jacket. Consequently there is a net flow of refrigerant into the cooling jacket.

A third aspect is that in its intended purpose in a domestic refrigerator or fridge/freezer the compressor may be located below the condenser. It has been found that where liquid refrigerant from the condenser is not entering the cooling jacket at a sufficient rate a head of liquid refrigerant builds up in the line extending to the compressor which tends to bring the pressure of the liquid refrigerant closer to the pressure of the compressed refrigerant. This effect has been found to provide a measure of self compensation at times when the relative pressures in the system might otherwise dictate against liquid refrigerant being brought into the cooling jacket space.

The Refrigerant

Another manner for reducing the heat build up by the compressor relates to the refrigerant. It has been found that using Isobutane (R600a) as a refrigerant in a linear compressor leads to synergistic advantages over the use of other refrigerants.

One fundamental difference between a linear compressor and a conventional compressor is the amount of volume above the piston at "Top Dead Centre". In a conventional compressor this volume is fixed by the compressor geometry at a small fraction of the displacement. In a free-piston linear compressor this "dead" volume varies with the power input and with the discharge pressure. At moderate powers the dead volume can be a significant fraction of the operating displacement, even as high as 25%.

The dead volume acts as a gas spring, absorbing and releasing energy during compression and re-expansion. However it is an imperfect spring due to the irreversible heat exchange with the cylinder walls. This heat exchange is approximately proportional to the temperature rise of the refrigerant during compression (or the temperature fall during expansion). This temperature rise depends on the specific heat ratio of the gas. For the commonly used refrigerant R134a this ratio is 1.127. It is similar for other commonly used refrigerants, for example CFC 12. However for isobutane (R600a) the specific heat ratio is 1.108. The table below gives the adiabatic temperature of the gas compressed to the saturation pressure matching the condensing temperature for a refrigerator (0 C evaporator temperature) and a freezer or fridge/freezer (−18 C evaporator temperature). They both have 32 C superheated gas entering the compressor and a condenser temperature of 42 C (these are typical values).

|  | Evaporator Temperature | |
|---|---|---|
| Refrigerant | −18 | 0 |
| Isobutane | 87 C. | 69 C. |
| HFC134a | 99 C. | 77 C. |
| CFC12 | 104 C. | 79 C. |

Thus the characteristics of isobutane and of other refrigerants having a low specific heat ratio are found to be particularly matched with the physical characteristics of the linear compressor. This improvement has been verified by experiment.

A series of tests were conducted on a 450 liter refrigerator. It had a mass flow meter on the suction line just prior to the compressor. The refrigerator was tested in an environmental chamber in accordance with the standard AS/NZS 4474.1-1997. The test was first run using refrigerant R134a. The test was subsequently run on two occasions using refrigerant R600a (isobutane). The test results were as follows:

|  | R134a | R600a (Test 1) | R600a (Test 2) |
|---|---|---|---|
| $T_{CONDENSOR}$ | 34.3 | 33.3 | 33.5 |
| $T_{EVAPORATOR}$ | −3.5 | −6.1 | −4.5 |
| Input Power | 22.3 | 18.1 | 17.8 |
| Refrigeration Power | 75.25 | 75.01 | 75.07 |
| Displacement | 7.96 | 8.7 | 8.48 |
| Coefficient of Performance | 3.38 | 4.14 | 4.23 |

The test results show that the coefficient of performance of the linear compressor running on isobutane was significantly improved compared to when running on R134a.

The Spring System

The cylinder 9 is supported by the discharge tube 18 and by the liquid refrigerant injection tube 34 which have a combined stiffness, $k_{cylinder}$, in the axial direction. The support spring 39 has very low stiffness in an axial direction and has neglible effect. The piston sleeve 4 is supported radially by the gas bearings formed by the cavities and passages in the boundaries of the cylinder bore and the cylinder liner 10. To get resonant oscillation of the piston and cylinder the main spring has a stiffness, $k_{main}$, such that the resonant frequency, $f_n$, can be estimated from the relation, $$f_n = \frac{1}{2 \cdot \pi} \cdot \sqrt{k_{main} \cdot \frac{m_{piston} + m_{cylinder}}{m_{piston} \cdot m_{cylinder}}}$$

Where $m_{piston}$, $m_{cylinder}$, are the sprung masses on the piston and cylinder springs, the natural frequency $f_n$ is usually 10 to 20 Hz less than the desired running frequency to allow for the increase in frequency due to the increase in stiffness resulting from the compressed gas.

As already discussed above, the compressor motor comprises a two part stator 5,6 and the magnets on armature 22. The magnetic interaction of the stator 5, 6 and armature 22 generates reciprocating force on the piston.

An alternating current in the stator coils, not necessarily sinusoidal, will give rise to substantial movement of the piston relative to the cylinder assembly casting 33 provided the alternating frequency is close to the natural resonant frequency of the mechanical system. This oscillating force creates a reaction force on the stator parts. Thus the stator parts 5,6 are rigidly attached to the cylinder assembly by the clamp spring 87.

In the present invention it is proposed that the main spring 15 has a stiffness much greater than the stiffness of the effective cylinder spring. The main spring raises the "second" mode frequency above the "third" so that the "gas spring" then only separates the modal frequencies further.

The actual running frequency (the "second" mode frequency) is determined by a complicated relation of the mass of piston and cylinder and by the stiffness of the cylinder spring, and main spring 15. Also when the discharge pressure is high the stiffness of the compressed gas must be added to that of the main spring. However, with the cylinder spring quite soft (for example with a stiffness 1/10 of the main spring) the running frequency is found reasonably accurately by:

$$f_{running} = \frac{1}{2 \cdot \pi} \cdot \sqrt{k_{main} \cdot \frac{m_{piston} + m_{cylinder}}{m_{piston} \cdot m_{cylinder}}}$$

External vibration due to sources other than from the fundamental due to piston/cylinder movement can be almost eliminated by reducing the oscillating mass and by ensuring that the cylinder springs are relatively soft. The stiffness of the cylinder spring can be reduced to a minimum by having no specific cylinder spring at all, and using the inherent stiffness (usually around 1000 N/m) of the discharge tube 18 (or where a cooling tube is used the stiffness of both discharge and cooling tube are combined, ie: 2000 N/m).

For the compressor to resonate at roughly 75 Hz, a piston mass of around 100 g and a ten to one cylinder to piston mass ratio, the main spring ($k_{main}$) needs to be about 40000 N/m. Typically the value of the gas spring will be lower than that of the main spring but not substantially lower. In the above case the running frequency might be expected to be 99 Hz where the gas spring ($k_{gas}$) works out at approximately 15000 N/m.

The Main Spring

Higher running frequencies reduce motor size but require more spring stiffness, and consequently higher stresses in the springs. Thus it is important for compressor longevity that the highest quality spring material be used. In the past, main springs made from pressed spring steel sheet are often used. However, the edges cut in the pressing operation require careful polishing to regain the original fatigue strength of the spring steel sheet.

In the preferred embodiment of the present invention the main spring is formed from circular section music wire which has a very high fatigue strength with no need for subsequent polishing.

Figure 2:
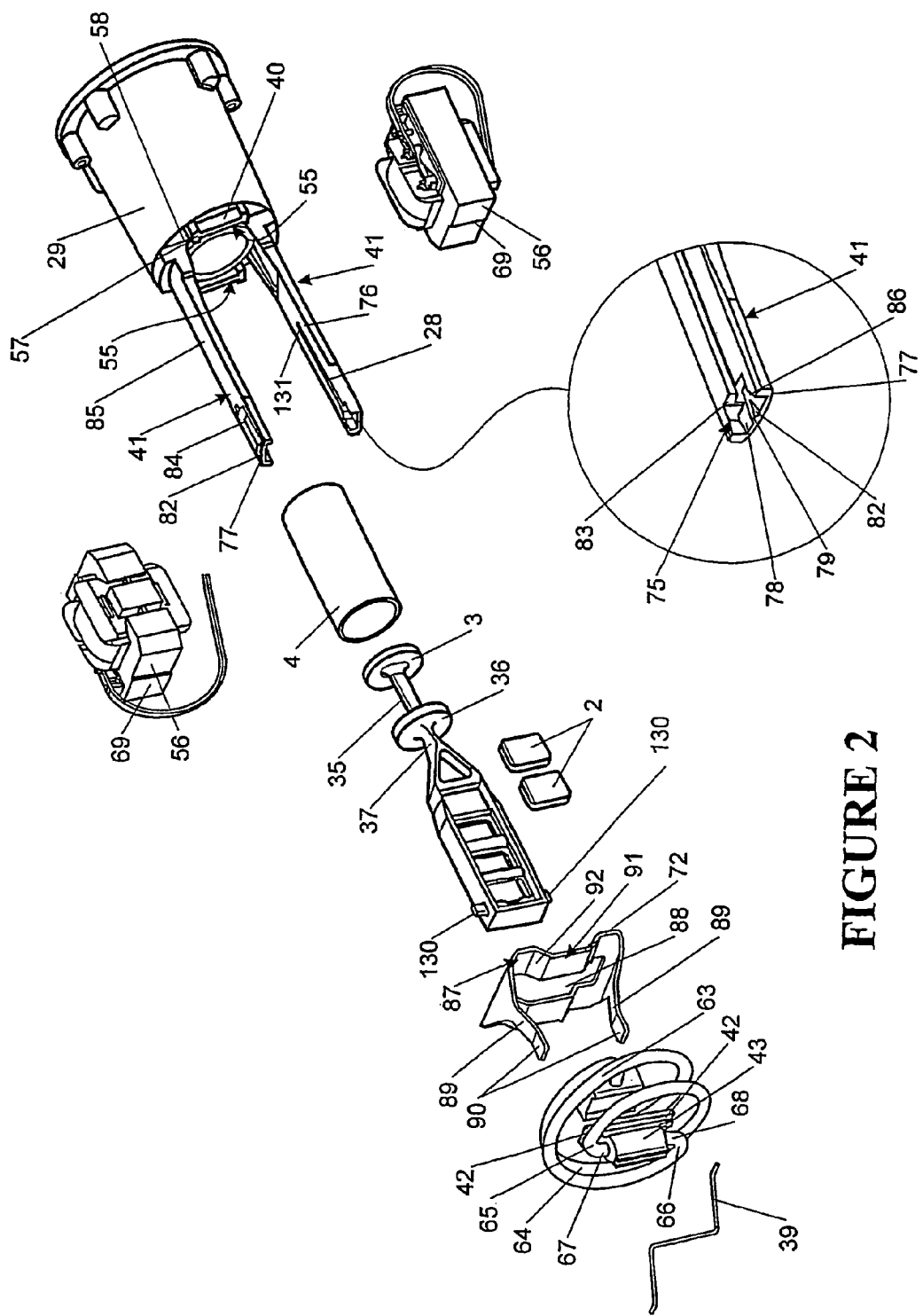
FIG. 2 is an exploded view of the motor end of the compressor assembly from an alternative direction.
Figure 3:
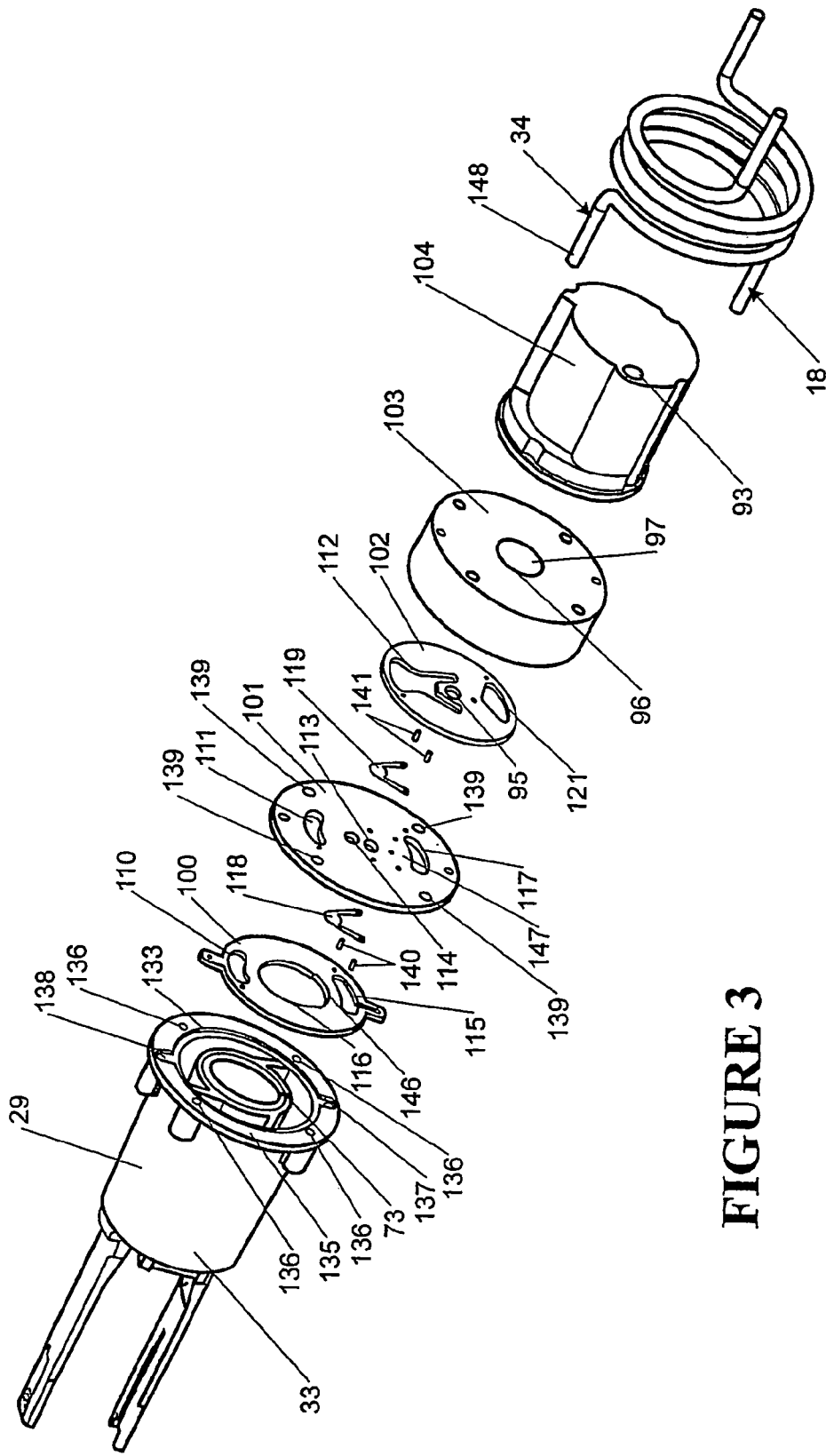
FIG. 3 is an exploded view of the head end of the compressor assembly from one direction.
Figure 4:
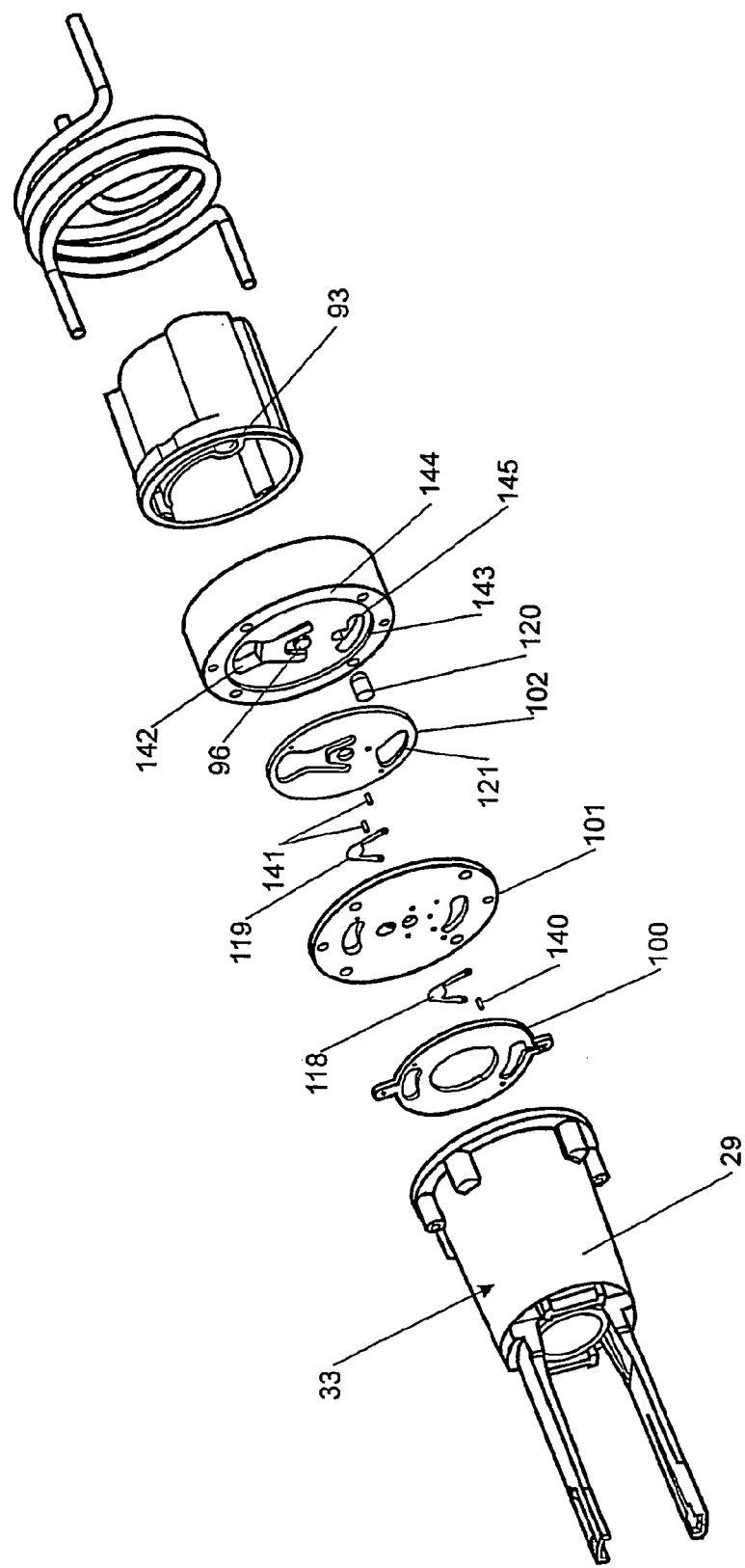
FIG. 4 is an exploded view of the head end of the compressor assembly from another direction.

The preferred embodiment for the main spring is shown in FIGS. 1 and 2. The spring takes the form of a continuous loop twisted into a double helix. The length of wire forming the spring 15 has its free ends fixed within a mounting bar 43 with lugs 42 for mounting to one of the compressor parts. As will be seen from FIG. 3 and the earlier description these lugs 42 mount to the cylinder part 1, and in particular mount into the slots in the legs 41. The spring 15 has a further mounting point 62 for mounting to the other compressor part as will be apparent in FIG. 3 and from the earlier description. In the preferred form this connection is to the piston rod 47 via a moulded plastic button 25. The spring 15 includes a pair of curved sections 63, 64 of substantially constant radius of curvature which each pass around the cylinder mounting bar. Each of these curved sections extends over a length of approximately 360°. Each section curves smoothly at both of its ends. At the mounting bar transitions 65, 66 they curve such that the lengths 67, 68 of them at the cylinder mounting bar are radially aligned. This sharper curve 65, 66 is selected to maintain a substantially even stress distribution along the transition. The alignment of the cylinder mounting ends 67, 68 aligns then with the cylinder mounting bar. The constant curvature sections 63, 64 of the spring 15 may be rendered of any length. In the example depicted they are each of approximately 360° in length.

In the manner depicted in FIGS. 1 and 2 the mounting bar 43 of spring 15 is on the farther side thereof. The central mounting point 62 is on the closer side thereof. The constant curved sections 63, 64 each curve smoothly at their lower ends to be radially aligned and continuous with one another across a diameter of the general circle of the spring at the mounting point 62. The alignment of this diameter is substantially perpendicular to the alignment of the ends 67, 68 at the cylinder part mounting bar 43.

The constant radius curves 63, 64 are placed in torsion by the displacement of the piston mounting point 62 relative to the mounting bar 43. Being constant radius the torsion stress along each of the sections 63, 64 are also substantially constant. The radial or substantially radial direction at the cylinder mounting sections 67, 68 and at the piston mounting point 62 reduces any torsion stresses where the ends of the spring are fitted within the mounting bar 43 and at the piston mounting point 62 and improves mounting of the spring 15 to both the cylinder part and the piston part.

Application of the Linear Compressor

The linear compressor according to the preferred embodiment of the present invention is primarily intended for adoption in a domestic type refrigeration system, for example a freezer, a refrigerator or a refrigerator/freezer combination. The compressor may directly replace compressors of other types such as a rotary crank compressors. The linear compressor receives evaporated refrigerant at low pressure through suction tube 12 and expels compressed refrigerant at high pressure through the discharge stub 13. In the refrigeration system the discharge stub 13 would generally be connected to a condenser. The suction tube 12 is connected to receive evaporated refrigerant from one or more evaporators. The liquid refrigerant delivery stub 14 receives condensed refrigerant from the condenser (or from an accumulator or the refrigerant line after the condenser) for use in cooling the compressor as has already been described. A process tube 16 extending through the hermetic casing is also included for use in evacuating the refrigeration system and charging with the chosen refrigerant.

The make up of a refrigeration system incorporating the present compressor does not form a part of the present invention. Many useful refrigeration system configurations are known and many more are possible. The compressor according to the present invention may be useful in any such systems.

The usefulness of the compressor according to the preferred embodiment of the present invention is not restricted to refrigeration systems for domestic refrigerators and freezers and may also be used in refrigeration systems for air conditioners. It might also be used as a gas compressor for non refrigerant applications in which case the liquid refrigerant delivery for cooling may be removed.

Operation and control of the linear compressor is effected by appropriate energisation of the stator parts 5, 6. A power supply connector 17 is provided through the hermetic casing 30, fitted to an opeing 19. Appropriate control systems for energisation of the windings do not form part of the present invention and many alternative drive systems for brushless DC motors are well known and applicable. An appropriate drive system is further described in our co-pending International patent application PCT/NZ00/00105.

Advantages

Many advantages of the linear compressor according to the preferred embodiment of the present invention have been outlined during the above detailed description. Some further advantages that have not already been outlined include:

(a) The resilient flexible connections of the piston connecting rod to the piston, and through the main spring to the mounting legs 41 of the cylinder casting 33, with the light weight of the piston and appropriate choice of materials for the piston sleeve and cylinder liner, together eliminate the need for an added lubricant in the compressor. Accordingly the detrimental presence of oil lubricant in the refrigerant throughout the refrigeration system, or the need for an accumulator or separator for the oil lubricant, is eliminated.

(b) The light weight piston and connecting rod assembly reduces the magnitude of the oscillating momentum of the two main compressor structures with a consequent reduction in vibration transmitted to the hermetic casing.

(c) The main spring is formed from a material having a high fatigue life and which does not require additional polishing operations after forming and the main spring shape and configuration minimises material usage, spring weight and spring size for the required spring strength.

(d) Placing the armature magnets on the piston connecting rod with the piston connecting rod operating directly in the stator air gap provides a laterally compact linear motor with accurate and effective alignment of the operation of the armature between the two parts of the stator.

(e) The compliant joints between the piston and the piston connecting rod and from the connecting rod to the cylinder part ensure that the piston sleeve does not exert localised pressure within the cylinder bore due to incorrect, non axial, orientation.

(f) Use of isobutane refrigerant in a linear compressor has been found to provide synergistic advantages compared to the use of refrigerants having higher specific heat ratios.

(g) Liquid delivery into a cooling jacket surrounding the cylinder provides evaporative cooling to the cylinder and cylinder head assembly and to the combined compressed gases stream leaving the compressor. Discharge into the high pressure gases in the jacket is accomplished without requiring active pumping devices.

(h) The overall compressor configuration is well suited to use in domestic appliances. The dimensions of the machinery space for a refrigerator or freezer may be reduced due to the low overall height of the hermetic casing. For interior space considerations the machinery compartment generally extends fully across the width of the appliance irrespective of the components which it is required to accommodate. However its height and depth are generally determined by the maximum height and depth requirements to fit the compressor. The low profile of the linear compressor according to the present invention is contributed to by the components of the compressor being arranged end to end rather than in a concentric configuration.

(I) The main spring and motor parts of the compressor are subject to resilient preloading of a degree determined by the geometry, size and shape of the parts. The potential for parts to become loose and subsequently knock, rattle or fail through operation of the compressor, due to imperfect assembly, due to normal manufacturing tolerances, or due to the effects of motor operation, is reduced or eliminated.

(j) Fusion of the piston rod to the main spring in a hot plate welding process in the manner described accurately positions the piston face with respect to the neutral position of the main spring. Accordingly the compressor can be operated to have low cylinder head clearances with confidence that the piston will not strike the cylinder head at the forward end of its travel.

The invention claimed is:

1. A method of manufacturing a linear compressor including, for connecting a piston of the linear compressor to a spring of the linear compressor, the following steps, in which step (a) and step (b) may be executed in any order:

(a) locating the piston in a predetermined axial position in the bore of the cylinder of the compressor;

(b) locating the piston connection point of a spring already connected with a cylinder part at a position based on a predetermined displacement of the spring or a position in which the spring exerts a predetermined reaction force, there being then a separation between said located piston and said located piston connection point of the spring; and (c) after steps (a) and (b), joining said piston and said piston connection point of said spring to maintain a rigid axial separation fixed according to the separation attained through steps (a) and (b).

2. A method as claimed in claim 1 in which step (c) includes fusing an extension from said piston to a mounting button on said spring and in said step of fusing, the axial dimension of said button or said extension is altered from a preassembly dimension.

3. A method as claimed in claim 1 wherein step (b) includes locating said piston in a position with a displacement beyond any normal operating position of said piston such that elements connected to said piston engage with elements of said cylinder part to locate said elements of said piston part at a predetermined position in a plane perpendicular to the axis of reciprocation of said piston in said cylinder.

* * * * *

UNITED STATES PATENT AND TRADEMARK OFFICE
CERTIFICATE OF CORRECTION

PATENT NO. : 7,185,431 B1
APPLICATION NO. : 10/399314
DATED : March 6, 2007
INVENTOR(S) : Neville David Seagar et al.

It is certified that error appears in the above-identified patent and that said Letters Patent is hereby corrected as shown below:

Column 14, Line 30 " $f_{running} = \dfrac{1}{2.\pi} \cdot \sqrt{(k_{main} \cdot \dfrac{m_{piston} + m_{cylinder}}{m_{piston} \cdot m_{cylinder}}}$ "

should be -- $f_{running} = \dfrac{1}{2.\pi} \cdot \sqrt{(k_{main} + k_{gas}) \cdot \dfrac{m_{piston} + m_{cylinder}}{m_{piston} \cdot m_{cylinder}}}$ --

Signed and Sealed this

Seventh Day of August, 2007

JON W. DUDAS
*Director of the United States Patent and Trademark Office*